United States Patent
Schneider et al.

(10) Patent No.: US 10,739,749 B2
(45) Date of Patent: Aug. 11, 2020

(54) SYSTEM AND METHOD FOR MANUFACTURING ARTICLE DYNAMIC MEASUREMENT, TOOL SELECTION AND TOOLPATH GENERATION

(71) Applicant: Kval, Inc., Petaluma, CA (US)

(72) Inventors: David Schneider, Petaluma, CA (US); Jedidiah Buck McCready, Santa Rosa, CA (US)

(73) Assignee: KVAL, INC., Petaluma, CA (US)

( * ) Notice: Subject to any disclaimer, the term of this patent is extended or adjusted under 35 U.S.C. 154(b) by 1 day.

(21) Appl. No.: 16/239,380

(22) Filed: Jan. 3, 2019

(65) Prior Publication Data
US 2020/0218222 A1    Jul. 9, 2020

(51) Int. Cl.
G05B 19/18 (2006.01)
G05B 19/401 (2006.01)

(52) U.S. Cl.
CPC ......... G05B 19/182 (2013.01); G05B 19/401 (2013.01); G05B 2219/34093 (2013.01); G05B 2219/35167 (2013.01)

(58) Field of Classification Search
CPC ............................ G05B 19/182; G05B 19/401
See application file for complete search history.

(56) References Cited

U.S. PATENT DOCUMENTS

| | | |
|---|---|---|
| 5,033,005 A | 7/1991 | Haske |
| 5,201,258 A | 4/1993 | Cremona |
| 5,255,207 A | 10/1993 | Cornwell |
| 5,933,353 A | 8/1999 | Abriam et al. |
| 6,134,338 A | 10/2000 | Solberg et al. |
| 6,292,197 B1 | 9/2001 | Langelaan |
| 6,311,100 B1 | 10/2001 | Sarma et al. |
| 6,459,952 B1 | 10/2002 | Dundorf |
| 6,954,676 B2 | 10/2005 | Dorsch |
| 7,043,331 B2 | 5/2006 | Sigtryggsson et al. |
| 7,328,539 B2 | 2/2008 | Hunt et al. |
| 8,137,038 B2 | 3/2012 | Katoh et al. |
| 8,225,579 B2 | 7/2012 | Fimbel, III et al. |
| 8,566,066 B2 | 10/2013 | Thompson et al. |
| 9,720,401 B2 | 8/2017 | Platt |
| 2002/0103557 A1 | 8/2002 | Land |
| 2003/0125828 A1* | 7/2003 | Corey ............ G05B 19/409 700/186 |
| 2003/0233163 A1 | 12/2003 | Dorsch |
| 2005/0115375 A1 | 6/2005 | Dick et al. |

(Continued)

OTHER PUBLICATIONS

International Search Report and Written Opinion of PCT/US19/69098 Completed Feb. 25, 2020; dated Mar. 18, 2020 15 pages.

*Primary Examiner* — Mark A Connolly
(74) *Attorney, Agent, or Firm* — The Roy Gross Law Firm, LLC; Roy Gross

(57) ABSTRACT

A system and method capable of encoding design intent for an article of manufacture wherein the original design intent encoding is abstract from any particular manufacturing process or machine, but allows for dynamic process adjustment accounting for real-world variations of stock material such that the design intent is preserved and the processing time and effort are not significantly affected. Because design intent is preserved, tool selection and machine process can be optimized to maximize quality and minimize manufacturing time and cost.

18 Claims, 14 Drawing Sheets

(56) References Cited

U.S. PATENT DOCUMENTS

| | | |
|---|---|---|
| 2007/0225856 A1 | 9/2007 | Slaughter et al. |
| 2007/0265724 A1 | 11/2007 | Mifsud et al. |
| 2009/0112357 A1* | 4/2009 | Hammond ............. B23P 6/002 |
| | | 700/194 |
| 2014/0362079 A1 | 12/2014 | Regan et al. |
| 2017/0246703 A1* | 8/2017 | Fagan .................. B23K 10/006 |

* cited by examiner

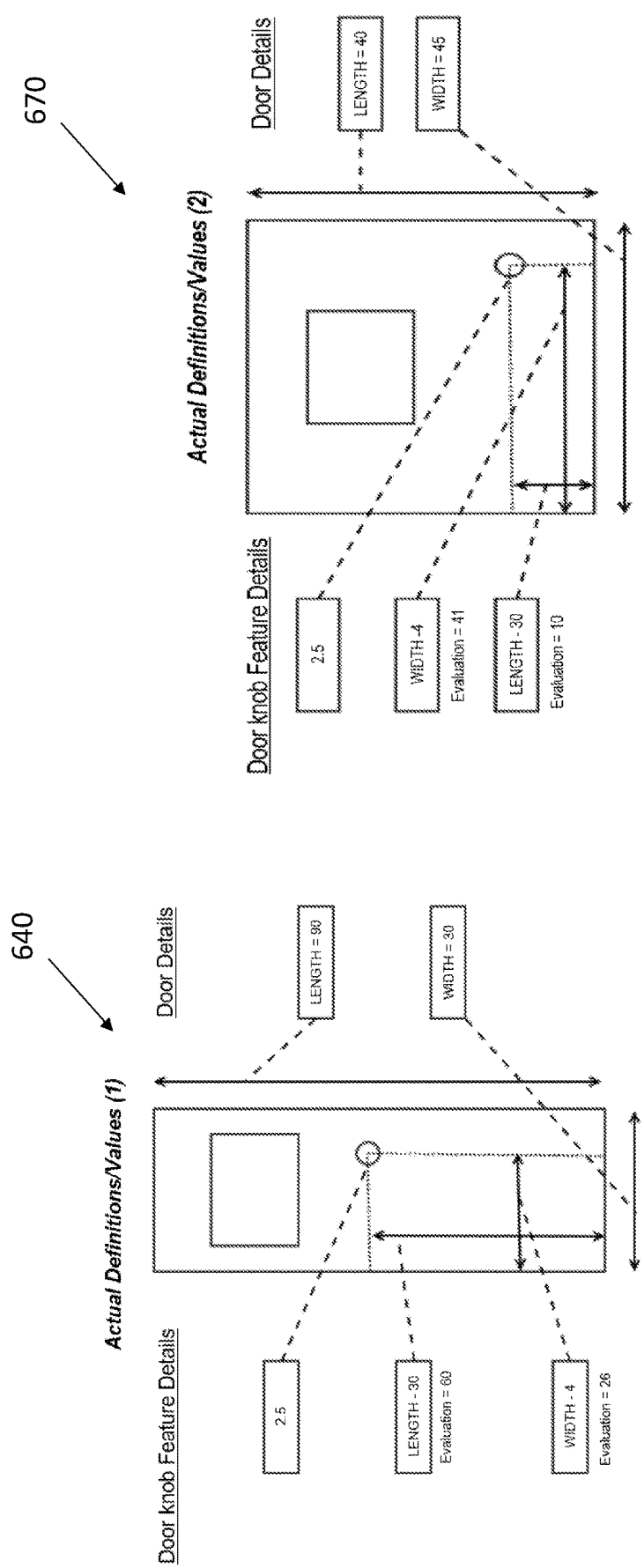

SYSTEM AND METHOD FOR MANUFACTURING ARTICLE DYNAMIC MEASUREMENT, TOOL SELECTION AND TOOLPATH GENERATION

FIELD OF THE INVENTION

The present invention relates to the field of manufacturing; more specifically, the present invention relates to computer-aided manufacturing, machining, and/or mill-working of articles of manufacture comprising wood, metal, and/or composites for use in residential and commercial building construction.

BACKGROUND OF THE INVENTION

The production of articles of manufacture and premanufacture used in residential and commercial building and construction is well known. Such construction and/or building articles of manufacture include but are not limited to doors, door panels, door jambs, door thresholds, window frames, window sashes, interior and exterior moldings and trim, headers, backing, and footers for drywall, "Cant" strips, doorstop moldings, units or members comprising studs, joists, rafters, and trusses, posts-and-beams, rafters, ridge blocks, decorative shutters, and storm shutters.

In the case of construction of production of such articles of manufacture and premanufacture, the introduction of semi-automated manufacturing of such articles has reduced costs and increased speed of manufacturing such articles.

A key aspect of such semi-automated computer-aided manufacturing is tool selection and tool-path generation. Tool-path generation may be defined as the path or route a tool takes during a manufacturing process, and the movement or handling of the article under manufacture in order to produce a desired product. One basic example of tool selection, tool-path, and article path may be selecting a simple manual vertical drill press and configuring the tool path of the vertical drill press.

As in a single axis drill press, an article of manufacture would be fixed (no article tool-path) below a drill bit (for example, a wedge tool selection) rotating along a longitudinal axis and the rotating bit displaced distally in relation to the drill press and along the longitudinal axis by an operator and into the article of manufacture to bore a hole of a desired depth into the article of manufacture (the tool-path, which includes both drill bit rotation direction and rate, bit displacement and rate of displacement).

In a fully automated, computer-aided or controlled toolpath generated environment, a tool-path would be generated via a computer or computer processor, including the rotational speed of the bit, bit displacement as a function of time (i.e. velocity, acceleration, jerk, the speed or rate of bit displacement, the throw or distance of bit displacement, the length and depth of movement and number of cuts, etc.). Information regarding the material being processed which would impact the speed of the plunge, such as material hardness and the like and would impact various parameters, which are controlled by a computer or computer processor.

Modern computer-aided manufacturing ("CAM") or computer numeric control ("CNC") manufacturing typically utilize two or more axes of control and a plurality of interchangeable tool types with a plurality of tool functions in order to control tool-path generation. Each placement or movement of an article, each tool exchange, each movement of a selected tool not in contact with the article, each movement of a tool in contact with the article, and each movement of article itself is "preprogrammed" and executed by a processor (i.e. a system computer) to create a desired article of manufacture and to perform various manufacturing and machining steps to create an article of manufacture.

Known systems and methods to produce such articles of manufacture include U.S. Pat. Nos. 5,033,005, 5,201,258, 5,255,207, 5,933,353, 6,134,338, 6,292,197, 6,459,952, 7,043,331, 7,328,539, 8,137,038, 8,225,579, 8,566,066, 9,720,401, US20020103557, US20030233163A1, US20050115375 and US20070265724.

However, these known systems and methods are deficient in many aspects and lack:

Adaptability: Known systems require feedstock specifications be preprogrammed into a tool-path generator prior to production runtime; and therefore, require feedstock of limited geometry based upon narrow specification tolerances. In other words, known systems anticipate feedstock of a certain geometry and require, on a per-run basis, reprogramming of a toolpath for feedstock of differing yet usable geometries.

Adequate feedstock and production article geometry validation: Known systems typically require pre-manufacturing of feedstock within tolerances compatible with preprogrammed feedstock specifications. If a feedstock is not pre-manufactured to specific tolerances, then pre-run manual measurements must be taken of the irregular feedstock to ensure proper programming and article production machine operation. This is time consuming and labor intensive. Moreover, typical operators of known systems often perform manual pre and/or post production geometry measurements for quality assurance or control purposes. However, performing manual pre or post production geometry measurements on a per article basis is extremely time consuming and labor intensive.

Automatic tool selection: Without automatic tool selection, the likelihood that an article of manufacture is out of specification or made via the wrong tool is greatly increased, which affects production efficiency and/or product quality, as well as manufacturing time. Manual systems lack automatic tool selection.

Design intent capture: In the case of articles of manufacture such as doors, door jams and the like, semi-automatic cutting, drilling, smoothing, and fitting elements are designed for manual quality assurance and control geometric measurement, resulting in deviation from the intent of a designer, lower production yields due to manual handling of articles, and undesirable tolerance rejects requiring article rework or scrap. Without design intent capture and mapping from nominal dimensions to production, the actual intentions of the designer are at the mercy of stock/blank dimensional tolerances, which decrease quality control and customer rejects.

The result of these deficiencies in adaptability, adequate feedstock and production article geometry validation, automatic tool selection and design intent capture causes an undesirable tradeoff between production speed and product quality. In manual processes, exact article specifications would have to be loaded into the toolpath generator prior to runtime, which is very time consuming; while use of generic toolpaths do not provide for high accuracy and quality in a finished product (i.e. toolpath selection based on the nominal is not accurate enough).

Furthermore, manual feedstock measurement and toolpath regeneration and recalculation is time-consuming on a per-article basis; and design time quality control validation (nominal validation) only checks for design parameters, not actual production articles (i.e. there is very little geometry validation, often post-mortem, sometimes manually before run, but never on a per-door basis as it is too time-consuming).

Furthermore, quality assurance inspection of received feedstock (pre-production) is extremely time-consuming, labor intensive and expensive. Post-production quality control (on the back-end) of processed articles can be very wasteful. If an article is "under-cut" it may be re-processed and salvaged; however, if an article is "over-cut" it may have to be repurposed or scrapped.

Moreover, with known system manual tool selection and/or toolpath generation, typically either the finished article is of low precision and quality or article production speed is very slow.

Accordingly, the present invention is directed to solving all of these problems.

SUMMARY OF THE INVENTION

It is an object of the invention to provide systems and methods for computer-aided article manufacturing without the speed/cost/quality tradeoffs.

It is an object of the invention to provide systems and methods for computer-aided article manufacturing of high precision articles of manufacture.

It is an object of the invention to provide systems and methods that adjust for the variation in blanks/stock materials as compared to nominal dimensional specifications combined with design intent or a job to be processed for an article of manufacture and to do so automatically via computer-aided article manufacturing to increase accuracy and speed of article manufacture.

It is an object of the invention to provide automation of the generation of toolpaths, automation of nominal vs actual geometry validation and automation of tool selection (for example for door/jamb geometry differences) to increase accuracy and speed of article manufacture.

It is an object of the invention to provide mapping and tracking of various parameters (the "numbers" mapping) and topologies (the intended "shape" mapping) with regards to automated stock tolerance quality assurance to increase accuracy and speed of article manufacture.

Objects of the invention are provided by a computer-implemented method of manufacturing to create an article of manufacture, the method comprising the steps of receiving nominal values of one or more dimensions of an article of manufacture; measuring, via a sensor, the article of manufacture to obtain actual dimensions of the article of manufacture; dynamically calibrating the nominal values based on the actual dimensions of the article of manufacture to establish adjusted nominal values; and generating a tool path for the article of manufacture based upon the adjusted nominal values.

In certain embodiments, the adjusted tool path maintains the design intent of the computer-implemented method of manufacturing.

In certain embodiments, the nominal values further comprise literal and symbolic specification values.

In certain embodiments, the adjusted nominal values retain the literal specification values of the nominal values while adjusting the symbolic specification values based on the actual dimensions.

In certain embodiments, the step of generating a tool path is based at least in part upon a numerical controlled subsystem, at least in part upon user entered article of manufacture dimensional data, and at least in part upon numerical controlled subsystem measured stock material dimensional data.

In certain embodiments, the computer-aided method further comprises generating, via a processor, automated tool selection data.

In certain embodiments, the computer-aided method further comprises providing and maintaining a database of a plurality of article of manufacture shape expressions for utilization by a user.

In certain embodiments, the computer-aided method further comprises software executing on the processor for providing and maintaining a database comprising analytic information related to numerical controlled subsystem production of articles of manufacture.

In certain embodiments, the numerical controlled subsystem includes a cutting tool selected from the group consisting of chisels, wedges, drill bits, shavers, router bits, saw blades, high voltage electrical cutters, chemical combustion cutters, high pressure water cutters, laser cutters, and combinations thereof.

In certain embodiments, the numerical controlled subsystem includes a joining tool selected from the group consisting of staplers, nailers, screw-drivers, adhesive systems, joinery mechanisms, chemical combustion welders, high voltage electrical welders, laser welders, friction welders, and combinations thereof.

In certain embodiments, the computer-implemented method produces an article of manufacture from the group consisting of custom doors, architectural doors, entry doors, pre-hung doors, door jambs, door trim, and combinations thereof.

In certain embodiments, the steps occur on a processor or on a computer.

Other objects of the invention are achieved by providing a computer-aided manufacturing system comprising: a processor configured to receive nominal values of one or more dimensions of an article of manufacture; and a sensor configured to measure the actual dimensions of the article of manufacture, wherein the processor dynamically calibrates the received nominal values of the or more dimensions of an article of manufacture based on the actual dimensions of the article of manufacture to establish adjusted nominal values and generates a tool path for the article of manufacture based upon the adjusted nominal values.

In certain embodiments, the adjusted tool path maintains a design intent of the computer-implemented method of manufacturing.

In certain embodiments, the nominal values further comprise literal and symbolic specification values.

In certain embodiments, the adjusted nominal values retain the literal specification values of the nominal values while adjusting the symbolic specification values based on the actual dimensions.

In certain embodiments, the system includes a numerical controlled subsystem, the step of generating a tool path is based at least in part upon a numerical controlled subsystem, at least in part upon user entered article of manufacture dimensional data, and at least in part upon numerical controlled subsystem measured stock material dimensional data.

In certain embodiments, the system generates, via a processor, automated tool selection data.

In certain embodiments, the system includes a database of a plurality of article of manufacture shape expressions for utilization by a user.

In certain embodiments, the database comprises analytic information related to numerical controlled subsystem production of articles of manufacturing.

In certain embodiments, the numerical controlled subsystem includes a cutting tool selected from the group consisting of wedges, drill bits, shavers, router bits, saw blades, high voltage electrical cutters, chemical combustion cutters, high pressure water cutters, laser cutters, and combinations thereof.

In certain embodiments, the numerical controlled subsystem includes at least two axes of freedom cutting tool control and/or at least two axes of freedom welding tool control.

In certain embodiments, the numerical controlled subsystem includes a joining tool selected from the group consisting of staplers, nailers, screw-drivers, adhesive systems, joinery mechanisms, chemical combustion welders, high voltage electrical welders, laser welders, friction welders, and combinations thereof.

In certain embodiments, the system produces an article of manufacture from the group consisting of custom doors, architectural doors, entry doors, pre-hung doors, door jambs, door trim, and combinations thereof.

Other objects of the invention are achieved by providing a method of computer-aided manufacturing, the method comprising the steps of providing a processor, a data storage, a user interface, and a network interface; controlling, via software executing on the processor, a numerical controlled subsystem for producing an article of manufacture; providing, via the user interface, numerical controlled subsystem dimensional manufacturing data for an article of manufacture; enabling, via the network interface, the numerical controlled subsystem to accept and dimensionally measure an article of manufacture material stock; and generating, via the processor, numerical controlled subsystem tool control path data; and utilizing the generated numerical controlled subsystem tool control path data to produce the article of manufacture.

In certain embodiments, the step of generating is based at least in part upon the numerical controlled subsystem's purpose and capabilities, at least in part upon the user entered article of manufacture dimensional data, and at least in part upon numerical controlled subsystem measured stock material dimensional data.

In certain embodiments, the method further comprises generating, via the processor, automated tool selection data.

In certain embodiments, the method further comprises providing and maintaining a database of a plurality of article of manufacture shape expressions for utilization by a user.

In certain embodiments, the network interface connects the processor to a network selected from the group consisting of local area networks, wide area networks, intranets, the Internet, satellite networks, and combinations thereof.

In certain embodiments, the database comprises information related to the capabilities and control of a plurality of subsystems.

In certain embodiments, the processor includes and updates database information collected via the network interface, the information identified, categorized, and processed for utilization by the processor and user.

In certain embodiments, the method further comprises software executing on the processor for providing and maintaining a database comprising analytic information related to numerical controlled subsystem production of articles of manufacturing.

In certain embodiments, the numerical controlled subsystem includes a cutting tool selected from the group consisting of wedges, drill bits, shavers, router bits, saw blades, high voltage electrical cutters, chemical combustion cutters, high pressure water cutters, laser cutters, and combinations thereof.

In certain embodiments, the numerical controlled subsystem includes at least two axes of freedom cutting tool control and/or at least two axes of freedom welding tool control.

In certain embodiments, the numerical controlled subsystem includes a joining tool selected from the group consisting of staplers, nailers, screw-drivers, adhesive systems, joinery mechanisms, chemical combustion welders, high voltage electrical welders, laser welders, friction welders, and combinations thereof.

In certain embodiments, the numerical controlled subsystem produces an article of manufacture from the group consisting of custom doors, architectural doors, entry doors, pre-hung doors, door jambs, door trim, and combinations thereof.

In certain embodiments, the data storage is remote from the computer.

In certain embodiments, the computer numerical controlled subsystem produces an article of manufacture made of and from material stock selected from the group consisting of metal, wood, glass, plastics, polymers, and combinations thereof.

In certain embodiments, an appropriate tool is automatically selected for executing the generated subsystem tool path.

In certain embodiments, the subsystem has the ability to be assigned a limited purpose in a multi-tiered approach for optimizing production time.

In certain embodiments, the method includes a two-stage validation process, wherein the first stage verifies whether a selected subsystem has the capabilities of manufacturing the entered dimensions and geometry type, and the second stage verifies whether the entered dimensions coincide with the material stock.

Other objects of the invention are achieved by providing a computer-aided manufacturing system comprising a processor, a data storage, a user interface, and a network interface; software executing on the processor configured to control via the network interface a computer numerical controlled subsystem for producing an article of manufacture, provide, via the computer user interface, a numerical controlled subsystem dimensional manufacturing data for an article of manufacture, enabling, via the network interface, the numerical controlled subsystem to accept and dimensionally measure an article of manufacture material stock, generate, via the processor, numerical controlled subsystem tool control path data; and utilize the generated numerical controlled subsystem tool control path data to produce the article of manufacture.

In certain embodiments, the step of generating is based at least in part upon the numerical controlled subsystem's purpose and capabilities, at least in part upon the user entered article of manufacture dimensional data, and at least in part upon numerical controlled subsystem measured stock material dimensional data.

In certain embodiments, the computer numerical controlled subsystem includes a cutting tool selected from the group consisting of wedges, drill bits, shavers, router bits, saw blades, high voltage electrical cutters, chemical combustion cutters, high pressure water cutters, laser cutters, and combinations thereof.

In certain embodiments, the computer numerical controlled subsystem includes at least two axes of freedom cutting tool control and/or at least two axes of freedom welding tool control.

In certain embodiments, the computer numerical controlled subsystem includes a joining tool selected from the group consisting of staplers, nailers, screw-drivers, adhesive systems, joinery mechanisms, chemical combustion welders, high voltage electrical welders, laser welders, friction welders, and combinations thereof.

In certain embodiments, the computer numerical controlled subsystem produces an article of manufacture from the group consisting of custom doors, architectural doors, entry doors, pre-hung doors, door jambs, door trim, and combinations thereof.

In certain embodiments, the system creates and maintains a database of a plurality of article of manufacture shape expressions for utilization by a system user.

In certain embodiments, the network interface connects the computer to a network selected from the group consisting of local area networks, wide area networks, intranets, the Internet, satellite networks, and combinations thereof.

In certain embodiments, the database further comprises information related to the capabilities and control of a plurality of subsystems.

In certain embodiments, the processor includes and updates database information collected via the network interface, the information identified, categorized, and processed for utilization by the computer and system user.

In certain embodiments, the data storage is remote from the computer.

In certain embodiments, the system includes software executing on the processor for creating and maintaining a database comprising analytic information related to computer numerical controlled subsystem production of articles of manufacturing.

In certain embodiments, the computer numerical controlled subsystem produces an article of manufacture made of and from material stock selected from the group consisting of metal, wood, glass, plastics, polymers, and combinations thereof.

In certain embodiments, the computer numerical controlled subsystem includes a cutting tool selected from the group consisting of wedges, drill bits, shavers, router bits, saw blades, high voltage electrical cutters, chemical combustion cutters, high pressure water cutters, laser cutters, and combinations thereof.

In certain embodiments, the computer numerical controlled subsystem includes at least two axes of freedom cutting tool control.

In certain embodiments, the computer numerical controlled subsystem includes a joining tool selected from the group consisting of chemical staplers, nailers, screw-drivers, adhesive systems, joinery mechanisms, combustion welders, high voltage electrical welders, laser welders, friction welders, and combinations thereof.

In certain embodiments, the computer numerical controlled subsystem includes at least two axes of freedom welding tool control.

In certain embodiments, the computer numerical controlled subsystem produces an article of manufacture from the group consisting of custom doors, architectural doors, entry doors, pre-hung doors, door jambs, door trim, and combinations thereof.

Other objects of the invention are achieved by providing a method for automating manufacture of article having varying parameters, comprising receiving via a processor a design intent based on nominal parameters, the design intent including relative positions of features; measuring via a sensor an article to obtain the article's real parameters; and creating an article design based on the real parameters using the design intent.

In certain embodiments, the method further includes validating the feasibility of the design intent based on nominal parameters.

In certain embodiments, the method further comprises validating whether the article is capable of being machined to include the intended features.

In certain embodiments, the article design further comprises varying the positions of the features on the real parameter staying in line with the initial design intent.

In certain embodiments, the method further comprises automatically selecting an appropriate tool.

In certain embodiments, the method further comprises automatically generating a tool path.

In certain embodiments, the tool path avoids excessive overlap.

In certain embodiments, the method further comprises machining at least part of the article based on the article design.

In certain embodiments, multiple machines are used to complete an article design.

In certain embodiments, one or more tools are automatically selected.

In certain embodiments, an operator is notified regarding a missing tool. In certain embodiments, an operator is notified if the geometry is not possible to achieve with the current tool set among the set of machines of the line.

In certain embodiments, the method further comprises validating whether a selected machine is capable to machine at least part of the article design.

In certain embodiments, the article is comprised of a material selected from a group consisting of wood, fiber glass, steel, or a combination thereof.

In certain embodiments, the method further comprises accounting for different materials automatically by adjusting the tool, bit, speed, oscillation, and/or rotation direction. In certain embodiments, the method further comprises accounting for different materials automatically by adjusting the acceleration and jerk as adjustment factors.

In certain embodiments, the method further comprises adjusting position as a function of time and/or angle as a function of time to prevent affecting the article's finish and/or tear-out.

In certain embodiments, the features are selected from a group consisting of shapes, dimensions, geometric constraints, tolerances, relationships, or a combination thereof.

In certain embodiments, the method further comprises comprising checking whether the article design is within tolerance.

In certain embodiments, the method further comprises a scheduler deciding which portion of a job will be run on which machine.

In certain embodiments, the article is machined according to the article design.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified.

FIG. 6B shows an example of Design intent mapping of the door of FIG. 6A having real dimensions.

FIG. 6C shows an example of Design intent mapping of the door of FIG. 6A having real dimensions.

DETAILED DESCRIPTION OF THE INVENTION

Figure 1:
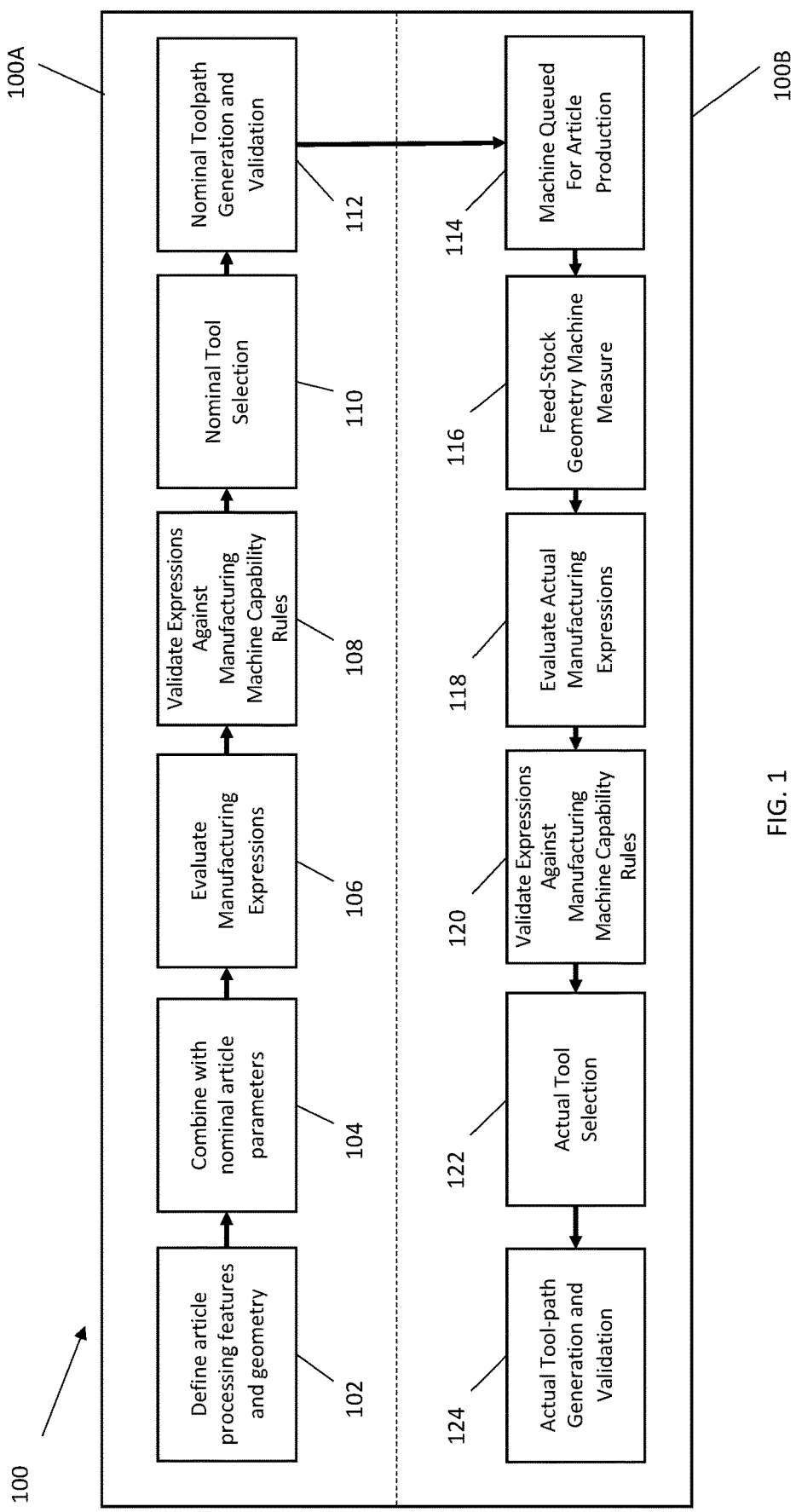
FIG. 1 is a process diagram of an embodiment of the invention.

It is contemplated that embodiments of the instant invention provide for tool-path generation optimized for speed to reduce time spent during recalculation and regeneration of tool-path data, and to reduce time spent loading feedstock material and retrieval of manufactured articles.

It is contemplated that certain embodiments of the present invention improve the speed and quality of door and jamb computer-aided manufacturing/machining operations by utilizing machining operation definitions which include dynamic door and jamb specification information.

In embodiments of the present invention, computer-aided sensors measure, read via visual or electromagnetic detection, material type, door and/or jamb measurement information from door and/or jamb handling and processing machines at the point when the door and/or jamb is in the machine and ready for further manufacturing steps. By utilizing the material and measurement information in conjunction with dynamic shape definition, a processor and/or computer generates and executes optimized tool-selection and tool-path data, which may then be used to further manufacture a door and/or jamb.

In certain embodiments, the speed and quality of articles is improved by allowing the definition of the machining operation to contain dynamic article of manufacture specification information. In certain embodiments, systems and methods read in measurement information from the processing machines at the point when the article of manufacture is in the machine and is ready to run. Using the measurement information, in conjunction with the dynamic definition of the shape, the system generates the optimized tool-path data, which is then run on the article of manufacture (such as a door or jamb). In certain embodiments, when an article of manufacture is in production, but before it has any related operations performed, it is measured using specialized systems which report the measured (actual) values back to the software. Expressions are re-evaluated, tools are re-selected, toolpaths regenerated, all elements are re-validated using actual measured values. If everything is valid, a user can run the job with confidence.

Embodiments of the invention provide article of manufacture designer intent to be captured through literal, symbolic, and functional specifications of article process geometry and article use parameters.

Embodiments of the invention provide feasibility validation for nominal design-time expression values, by generating and validating tool selections and toolpaths based on nominal expression values.

Embodiments of the invention are integrated into existing non-computer-aided machinery.

Embodiments of the invention are integrated into existing computer-aided machinery whereby the existing software program is made compatible with the inventive software programming, or the software programming replaces the existing computer code.

Embodiments of the invention are contemplated utilizing a processor, related ancillary equipment, and any existing sensor technology present in article manufacturing equipment that may be upgraded to be compatible with software executing on the processor.

Embodiments of the invention provide systems and methods for article manufacturing machinery, utilizing both known generic and custom machinery, that utilize the instant invention to improve production speed, quality, and overall system efficacy.

Embodiments of the invention provide systems and methods whereby the articles of manufacture are made from less stringently produced (i.e. lower tolerance) material or feedstock which is desirable for in-house production operations and supplying vendors.

Embodiments of the invention involve software paired with machinery to produce an integrated system for computer-aided article manufacture.

Embodiments of the invention are integrated into both the real-time side (integrated into the machinery) and the client/application side.

Embodiments of the invention provide high tolerance of material stock variations in article of manufacture.

Embodiments of the invention allow for dynamic definitions of shapes, or for on-the-fly regeneration and optimization of tool paths and tool selections. Without this system, these processes would not be done in any sort of automated way, resulting in lower quality products, or a much slower process prone to human error. As construction and building technology advances, the present invention contemplates articles of manufacture yet to be developed and integrated into the "construction and building arts."

Embodiments of the invention involve a machine that implements the software to control the physical embodiment of the door dimension sensor, coordinates when to measure and to communicate the values and interfaces to use the newly generated tool selections and toolpaths.

Embodiments of the invention are directed to a turnkey system that is able to integrate with various machines and software (i.e. the invention pairs real-time mechanical measurement apparatus with client software algorithms).

Embodiments of the invention provide a toolpath generator optimized for speed and efficiency so that very little time is spent during regeneration and no extra time is spent removing material than necessary.

Embodiments of the invention involve both retrofitting and being adapted to new machines, such that as new machines are developed, the same jobs can be run on them, even though that machine was not conceived when the job was being defined.

Definitions

Nominal measurements: Nominal measurements are ranges, generalized measurements, or estimated measurements that can vary from actual measurements. These variabilities in measurements often occur when using stock materials, but here also refer to materials having unknown or imprecise measurements when compared to the real dimensions. When working with such materials it is important to adjust process operations to be based off of the actual measurements in order to achieve a high-quality final product.

Design Intent: Design Intent is the intent of a user, so that an article of manufacture is machined according to specific parameters that account for the dimensions of the piece of material and type of material.

Literal Specification Values: Literal specification are hard-coded measurements which do not vary regardless of the size and shape of the actual article parameters.

Symbolic Specification Values: Symbolic specifications are symbols, expressions, functions or other relative measurements that can vary upon realization of actual article measurements and/or parameters that are different from the nominal measurements and/or parameters, allowing for the completed product to retain the design intent.

Referring to the figures:

FIG. 1 is a schematic process diagram that depicts an embodiment of the instant invention. Article processing system 100 includes Design-time processing 100A and Production-time processing 100B defining an article's features and geometry 102 combining the features and geometry with nominal article parameters 104, evaluating manufacturing expressions 106, validating expressions against manufacturing machine capabilities 108, wherein the feasibility of nominal design-time expression values are evaluated and validated. Additional steps involve selecting a tool based on nominal parameters 110, generating and validating tool selections and toolpaths based on nominal expression evaluation 112, queuing a machine for article production 114, measuring feedstock geometry 116, evaluating actual manufacturing expressions 118, validating expressions against manufacturing machine capabilities 120, selecting an actual tool 122, and generating actual tool path and validation 124.

More specifically, step 102 includes receiving user process geometry, capturing a user or designer's design intent through literal and symbolic specifications. As defined above, literal specification are hard-coded measurements which do not vary regardless of the size and shape of the actual article parameters. Symbolic specifications are symbols, expressions, functions or other relative measurements that can vary upon realization of actual article measurements and/or parameters that are different from the nominal measurements and/or parameters, allowing for the completed product to retain the design intent. This can potentially include referring to production-time measured quantities as part of expressions as well as defining datum orientation amongst available edges in the conceptual model. Potential quantities used as references for a production article include but are not limited to width, length, thickness, hinge-side bevel angle, and lock-side bevel angle. Additional feature geometry can be referred to symbolically, e.g. if there is a circular cut feature defined, another feature might refer to the first cut's diameter to define its own diameter, perhaps defined as half of the diameter of the first diameter.

Literal values, symbolic references and functions can be combined with mathematical expressions that are evaluated at design-time and at production time. Typical expressions can contain operator elements such as but not limited to Subtraction, Multiplication, Division, Addition, and Parenthesis (explicit grouping); Math functions such as but not limited to Absolute value, Sine, Cosine, Tangent, Max, and Min.; Math constants such as but not limited to E—Euler's number (2.71828 . . . ), and PI—Pi (3.14159 . . . ).

Potential datum that can be referenced for a particular feature group on a particular axis, such that design intent and expressions can be matched to the intention of the job designer and mapped/validated to the production article includes but is not limited to, Top Face, Bottom Face, Top Edge, Bottom Edge, Lock-side, Hinge-side.

Step 104 defines nominal geometry, capturing intent for nominal dimensions of an article for Design-time validation and implied mapping to production-time topologies by defining major parameters of a job. Major parameters of a job include but are not limited to Width, Length, Thickness, Hinge-side Bevel Angle, Lock-side Bevel Angle; Combining features with article geometry; Catching and reporting specifics of impossible/illegal combinations of expressions and specifications of an article job including all of the features.

Step 106 evaluates expressions converting all symbols to literal values and fully evaluating all functions and expressions. If this step cannot be completed, there are issues with the expressions.

Step 108 validates expressions and checks rules governing capabilities of the machines and/or production line. All evaluated expressions pass validation rules, such as but not limited to verifying a particular feature is positioned over valid geometry rather than a disjoint feature that does not intersect with the article.

Step 110 selects an appropriate tool or tools to use based on the evaluated nominal values and validates that the selected tools are available to be used for nominal dimensions.

Step 112 generates a toolpath(s) based on nominal evaluated expressions, nominal specification and validates nominal toolpath for manual review and automatic checking for detailed validation.

Step 114 begins Production-time processing 100B by queuing a job for production 114.

Step 116 measures actual dimensions of an article to be processed on a machine. Measurements include but are not limited to length, width, thickness, and out-of-square. In certain embodiments, measurement is not limited to a specific machine or a specific order. All of the measurements might be taken at the first machine, or they may be taken one at a time from 3 progressive machines, or they can be taken redundantly by 4 progressive machines. Any combination is valid and is decided by the scheduling algorithm combined with the machinery software.

Step 118 evaluates design expressions as relating now to actual article dimensions. With one or more of the dimensions having been actually measured, the evaluation can take place again, this time using updated references to real data. The symbolic and variable design parameters are not hard-set to specific measurements allowing for them to adjust to accommodate the actual dimensions of the production article.

Step 120 validates that the adjusted design values still conform to the machine rules. Using the newly evaluated expression values, the validation rules can be re-checked to see if the production article is actually conformant to the ruleset.

Step 122 selects the appropriate tools to be used on the production article now that real measurements have been taken and validates whether the appropriate tool is available. Given the newly-evaluated expressions and validation rule checking, appropriate tools can be selected from the current set of tools on the line/machine, or the system can determine that the job cannot be run on this line.

Step 124 generates toolpath(s) and validates whether the toolpath is feasible based on the actual parameters. With the newly evaluated expressions and the newly selected tools, the toolpaths can be regenerated to match up. After generation, they are automatically validated and can be manually reviewed. If the toolpath cannot be generated or fails validation, the job will be rejected for this article. With the toolpath successfully generated and passed validation, a user can now run the job with confidence.

Figure 2:
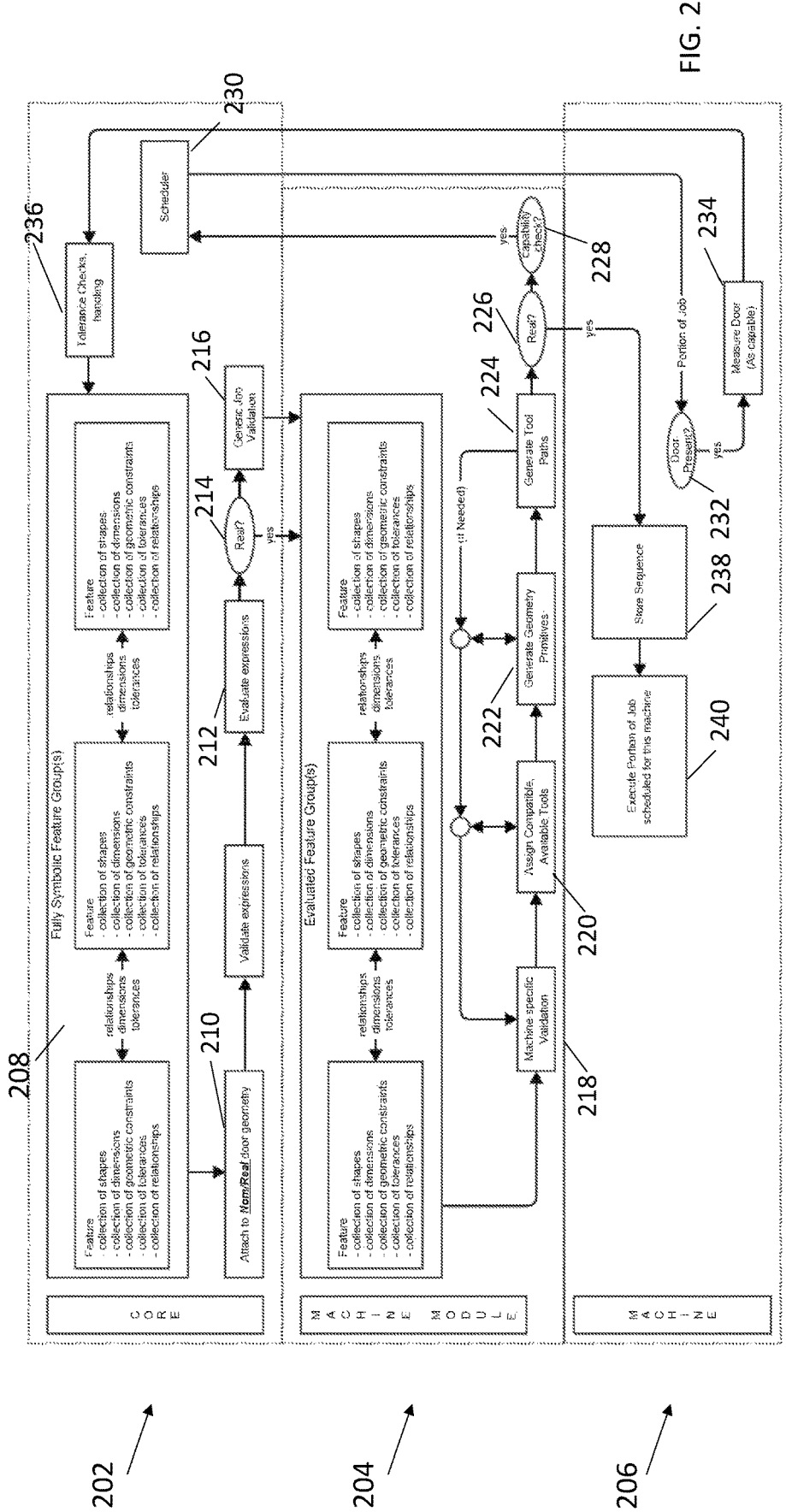
FIG. 2 is a process diagram of an alternate embodiment of the invention.

FIG. 2 is a schematic process diagram of an alternate embodiment. Process 200 has three architectural layers including a Core 202, Machine Module 204, and Machine 206. Core 202 handles machine agnostic tasks, Machine Module 204 handles machine-type specific tasks, and the Machine 206 handles the machine and article specimen-specific tasks.

Core 202 includes the steps of defining door process geometry 208, attaching process geometry to article dimensions 210 (either nominal or real), evaluating expressions 212, deciding whether the input is real or nominal 214, generic job validation 216, scheduling 230, and tolerance checks and handling 236. Machine Module 204 includes machine-specific job validation 218, Assigning available/compatible tools 220, generating geometry primitives 222, and generating toolpaths 224. Machine 206 includes deciding whether the input is real 226, capability check 228, checking whether the door is present 232, measure article 234, sequence storage 238, execute at least a portion of a job 240.

The sequence starts at step 208, performing a double pass over the flow chart using nominal values on the first pass during Design-time and then real values on the second pass during Production-time. Step 208 and the following steps of the flow chart are repeated after Measurement 234 and Tolerances pass 236 have been executed.

While, this embodiment depicts a single machine, the software stack can have a single core and multiple machine modules and/or machine children nodes, running multiple times in parallel across multiple machines in a line with a scheduler having a capabilities view for a given job, as well as a quantified level of performance for the toolpaths, since the estimated time to complete can be part of the capability report, thus the scheduler can decide how and where it is best to run portions of a job.

Step 208 defines article process geometry, capturing design intent through literal and symbolic specification of an article for manufacture, here a door is used as an example. This can include referring to potential production-time measured quantities as part of expressions as well as defining datum orientation amongst available edges in the conceptual model. Quantities used as door references include but are not limited to Width, Length, Thickness, Hinge-side Bevel Angle, Lock-side Bevel Angle, and other measurements and quantities known/used in the industry. Literal values, symbolic references and functions can be combined with mathematical expressions that are evaluated at design-time and at production time. Typical expressions can contain elements such as but not limited to Operators including Subtraction, Multiplication, Division, and Addition; Parenthesis such as for explicit grouping; Mathematical functions including Absolute value, Sine, Cosine, Tangent, Max, and Min; Math constants such as E—Euler's number (2.71828 . . . ), PI—Pi (3.14159 . . . ).

Datum that can be references for a particular feature group on a particular axis, such that design intent and expressions can be matched to the intention of the job designer and mapped/validated to the production door includes but is not limited to Thickness Axis including Top Face and Bottom Face, Length Axis including Top Edge and Bottom Edge, Width Axis including Lock-side and Hinge-side.

Step 208 is a diagram showing how Features can be composed into Feature groups and how they contain definitions of the shapes, dimensions, constraints tolerances and relationships of process geometry. Features have their own unique definitions internally, but they can also be built on each other, which is shown in the relationship arrows.

Step 210 attaches process geometry to either nominal or real door dimensions. Nominal dimensions are used when no door data is available. Real door dimensions are used when the door data has been measured. Major parameters of the door job include but are not limited to Width, Length, Thickness, Hinge-side Bevel Angle, Lock-side Bevel Angle, and Door Specimen Tolerances. Optionally, there is an expression validation step to ensure the process geometry of step 210 is possible for either the nominal or the real door dimensions. Validation steps can be added after every step in the process to ensure that new job criteria can be accomplished before reaching a processing stage, avoiding potentially creating waste in the form of unusable stock material due to incomplete work, inappropriate tool use, offset measurement, misalignments, etc. Furthermore, any validation steps can be removed from the embodiments of the present disclosure without departing from the present invention as the novelty of disclosed embodiments do not rely on the validation steps.

Step 212 converts the symbols to literal values and fully evaluates all functions and expressions. If this step cannot be completed, it means that there are issues with the expressions, symbols, functions, or other parameters necessary for the job to be completed properly as intended.

Step 214 distinguishes between whether the data and parameters are of a real article geometry, rather than nominal parameters. If it is not Real geometry (first pass), then generic job validation is performed. If it is Real geometry (second pass), the generic job validation step is skipped in favor of only machine-specific job validation, since that is more specific and captures everything that is done in the generic validation step in addition to more checks for the machine.

Step 216 makes sure that all evaluated expressions pass validation rules, such as but not limited to whether a particular feature or features are positioned over valid geometry or it is a disjointed feature that does not intersect with the door.

Step 218 validates machine specific jobs. Any special rules that must be adhered to for this machine are checked here, in case anything becomes invalid after nominal or real geometry evaluations.

Step 220 assigns available compatible tools, if other tools are preferred, an engineer may be prompted to manually install the tool or override the prompt in favor of performing the job with the available tools. In step 220 a tool is selected to use based on evaluated nominal values. This is preferably done on a machine-specific level since that is where the tool definitions and specializations exist. Optionally, this step can include validation that tools are available to be used for nominal or real dimensions.

Step 222 generates geometry primitives. This step projects feature-level shapes given their specific dimensions, parameters, and features into a machine-level shape that is used for specific toolpath generation. This step can be machine-specific such as but not limited to identifying information regarding what method two routers work in tandem from the top and bottom of the door to accomplish a single shape simultaneously and synchronously.

Step 224 generates toolpaths. This step takes the primitive geometry and selected tools and generates the toolpath specifics and can validate toolpath for manual review and/or automatic checking for detailed validation, validating tool selection if needed, and can trigger a re-selection of tools and path generation if some of the toolpath was not possible given the initial tool selection.

Step 226 distinguishes between whether the input is of real geometry. If it is not real (first pass), then proceed to capability check. If it is real (second pass), then proceed to store sequence.

In certain embodiments, various steps 220, 222 and 224 can be double-backed and checked/assigned/generated, such that these steps can be repeated multiple times in the process as needed.

Step 228 distinguishes between whether this a compatibility check. If this is a compatibility check, the core asking the machine module layer whether it can do a whole job, a feature, or a set of features, then proceed to deliver that information to the scheduler. Steps 220, 222 and 224 may fail if it cannot be done on this machine which will be delivered to the scheduler. If this is not a compatibility check, do nothing.

In Step 230 the scheduler decides which portion of the job will be run on which machine and gives that machine the portions of the job that it will be running, optionally waiting until a door is present.

Step 232 distinguishes between whether a door is present in the machine. If a door is not present in the machine, do nothing. If a door is present in the machine, proceed to measure.

Step 234 measures the article which in this case is a door. In step 234, the operative machine measures whatever the machine is capable of and has been directed to measure by the scheduler, of such as but not limited to length, width, thickness, out-of-square. These measurement capabilities might be distributed throughout a machine or line of machines.

Step 236 checks tolerances and handling. In step 236 the system checks to make sure that the measured door values are within tolerance and optionally compares against nominal specifications from step 210. If the tolerances are out of spec, actions and measures are taken to resolve the situation. This can include prompting an operator as to how he/she wants to proceed, rejecting the door off the line, or other user preferred resolutions.

In step 238 the generated tool paths, tool selections, and various machine control commands are queued on the machine to run the job.

In step 240 the portion of the job that was stored on the machine is now executed on the machine.

Optionally varying levels of measurement may be included on the machinery depending on the machinery configuration. The system can be tolerant of any subset of measurement devices present in the line. Door dimensional sensors may include capabilities such as to measure lock-side length, hinge-side length, overall width; Localized geometry variation measurement with toolpath implications (any axis) including thickness, squareness, flatness, edge, bevel, and material detection. Redundant measurement apparatus may be present in multiple machines, optimal measure path/sequence is determined by the scheduler. Toolpath generation is optimized for speed so that very little time is spent during regeneration and no extra time is spent removing material than necessary.

The systems and method can integrate into both the real-time side (integrated into machinery) and client/application side. The machine implements real-time software to control the physical embodiment of the door dimension sensor, coordinates when to measure and to communicate the values and then interfaces to use the newly generated tool selections and toolpaths. The client software can implement the technology since it is coordinating the process at a high-level.

The present embodiments have the ability to operate as a turnkey system, integrating within a machine as well as client software, and pairing real-time mechanical measurement apparatus with client software algorithms.

Figure 3A:
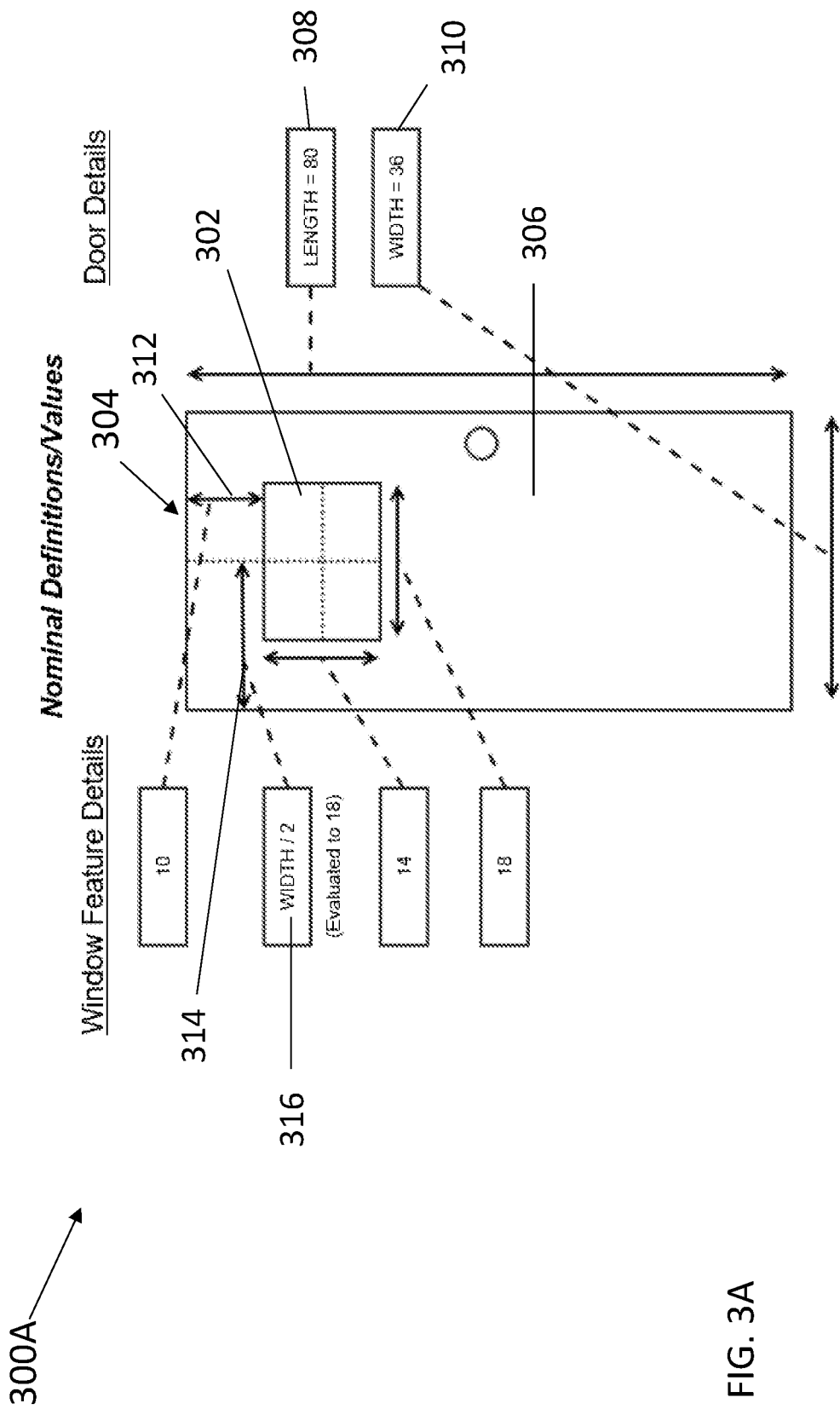
FIG. 3A is a schematic diagram of a use case having nominal dimensions.

FIG. 3A is a schematic diagram of a use case having nominal dimensions. Example 300A provides an automatically updated toolpath mapping of design intent. In this example, a user (not shown) wishes to center a window 302 (width-wise) near the top 304 of door 306. The door length 308 is set to eighty inches, the width 310 is set to thirty-six inches, the window position (height-wise) 312 is set to ten inches from the top 304, and the window 302 itself set to measure fourteen inches by eighteen inches.

While the preceding dimensions are in this case statically codes literal values, the window position (widthwise) 314 is set to be dynamically calibrated based on the actual width of the article being processed which can vary from nominal dimensions. Example 300A uses the symbol WIDTH/2 316 in an expression that divides the actual width values by 2 which results in finding the center (widthwise) of the article. In this case, the nominal width of the door is thirty-six inches, so the nominally evaluated center WIDTH/2 316 of the window is eighteen inches.

Figure 3B:
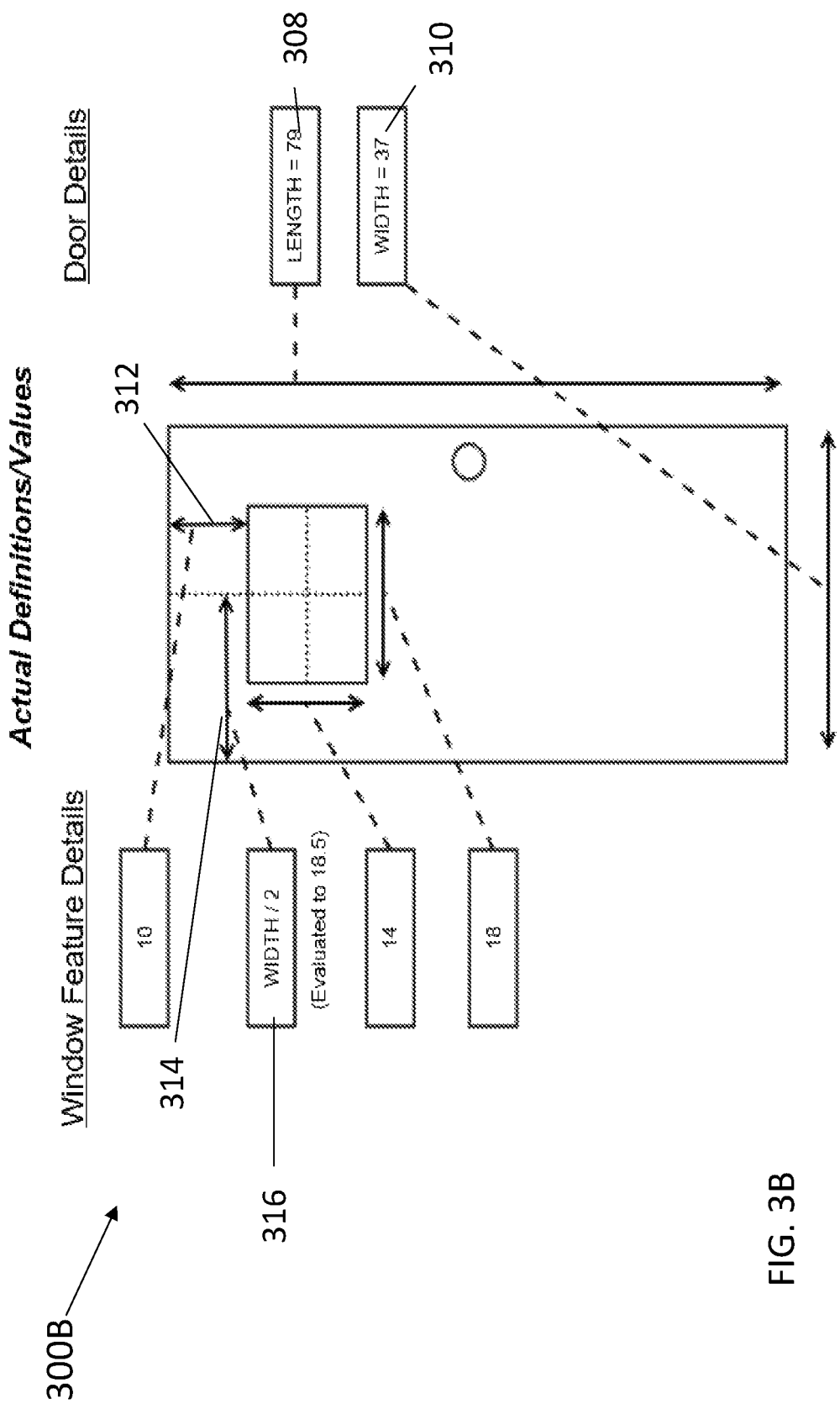
FIG. 3B is a schematic diagram of the use case of FIG. 3A having actual dimensions.

FIG. 3B is a schematic diagram of the use case of FIG. 3A having actual dimensions. Example 300B shows the actual measurements of the article to be processed. When an article, in this case a door, is submitted for production it goes through a measurement process. In this case, the width 310 is actually thirty-seven inches, and the length 308 is actually seventy-nine inches. While the window position (height-wise) 312 can stay the same without major changes to the design, the window position (width-wise) 314, however, would end up off center by half an inch, ruining the final product.

The system evaluates the new WIDTH/2 316 and sets the window position (width-wise) 314 to eighteen and one-half inches to account for the change in measurements. This shifts tool paths and maintains the design intent of centering the window.

Figure 4A:
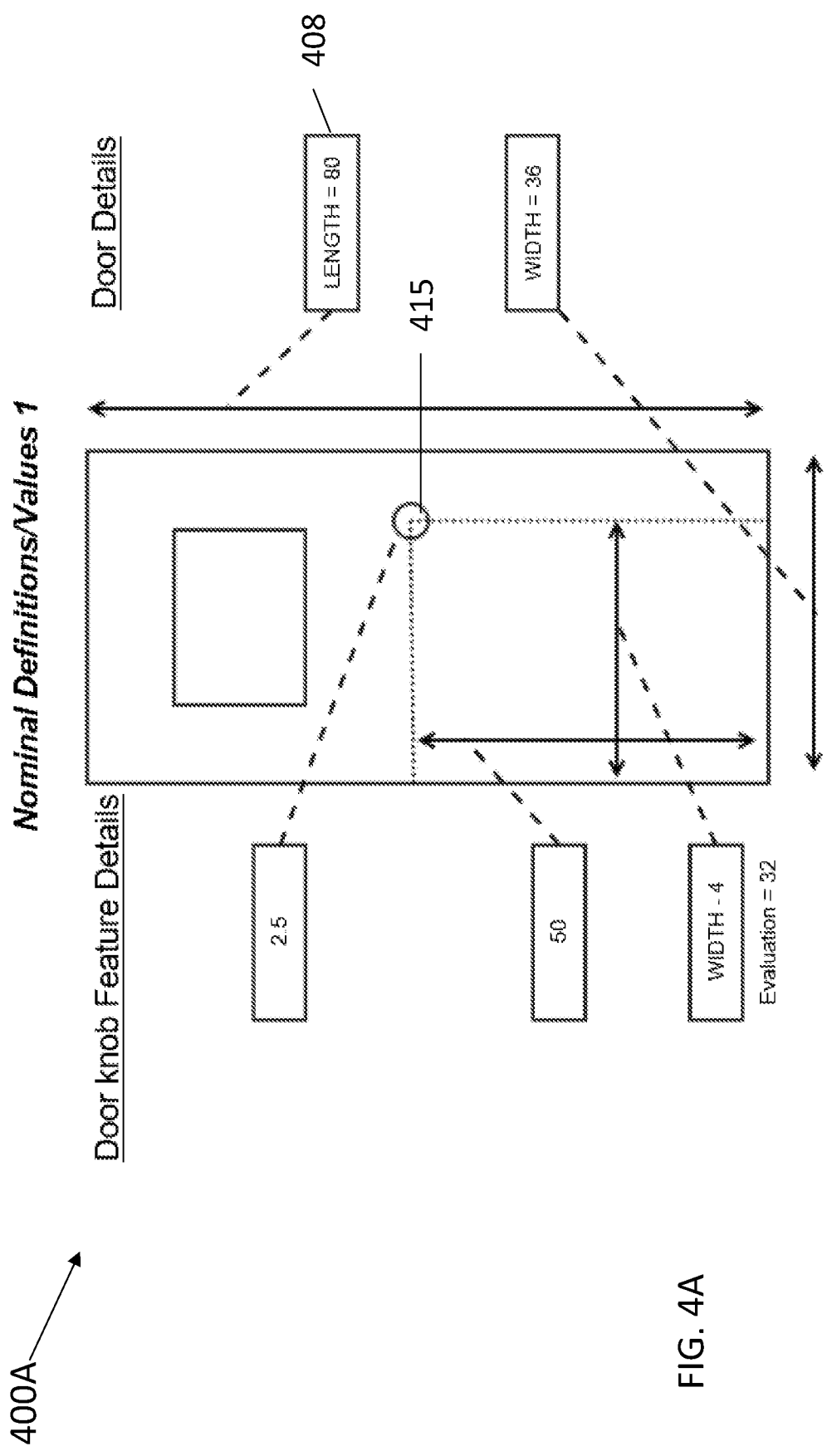
FIG. 4A is a schematic diagram of datum selection based on nominal dimensions.

FIG. 4A shows example 400A which is set to automatically update toolpath mapping of design intent based on datum choice. An article can have a set position for a feature 415 and be measured from different points of reference. In this example with the Length 408 set to eighty inches a feature position can be calculated for example at fifty inches from the bottom, or thirty inches from the top as shown in FIG. 4B.

Figure 4B:
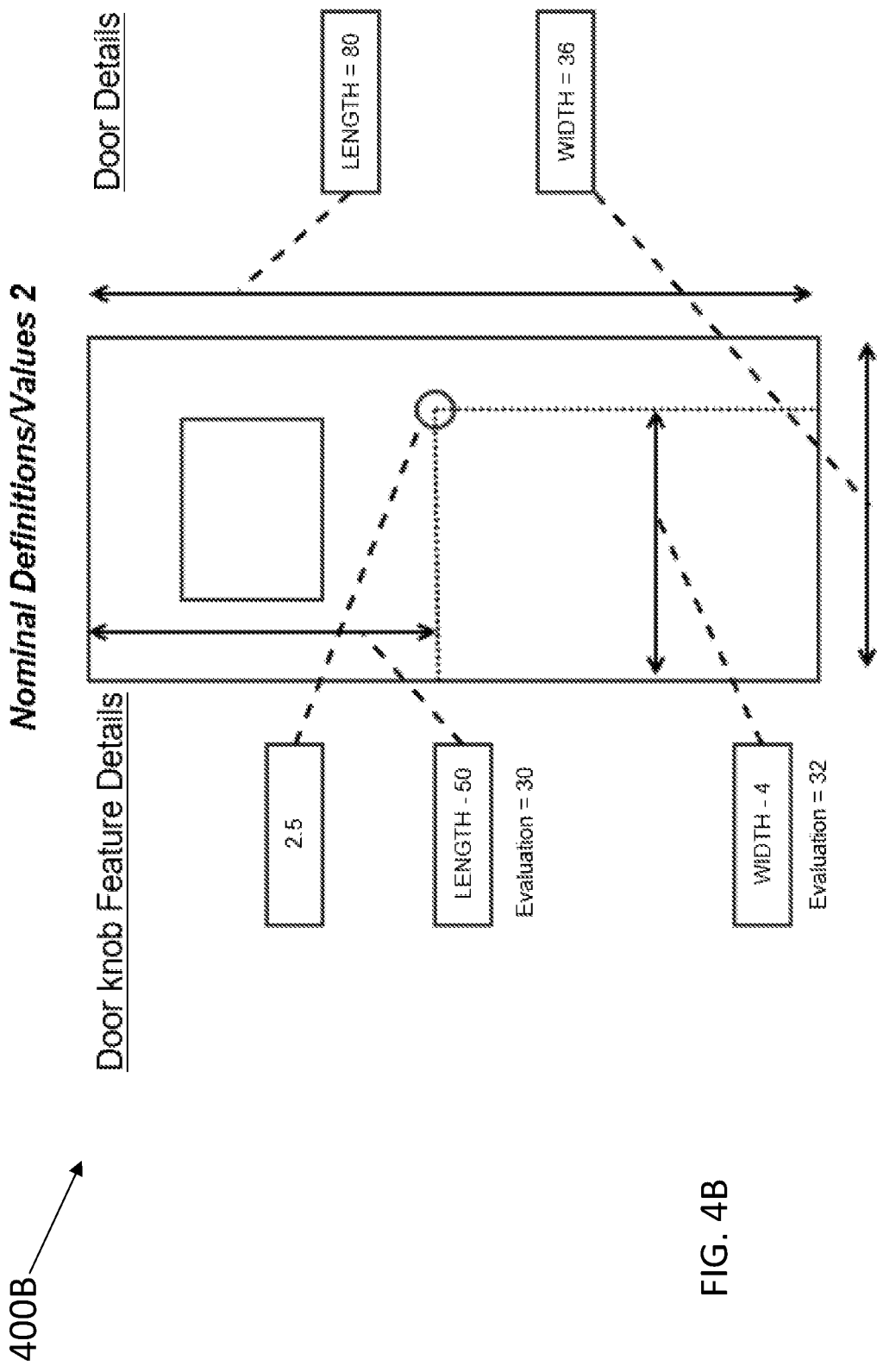
FIG. 4B is a schematic diagram of an alternate datum selection based on the same nominal dimensions of FIG. 4A.

FIG. 4B shows example 400B which is an alternate method of defining a feature position. In this case, the system measures from the top and automatically evaluates the parameters of the design intent and sets the feature position to thirty inches from the top, keeping the intended design equivalent to fifty inches from the bottom.

Both of these definitions have equivalent evaluations at design-time using nominal dimensions, and the resultant production door also maps the design intent equivalently.

Figure 4C:
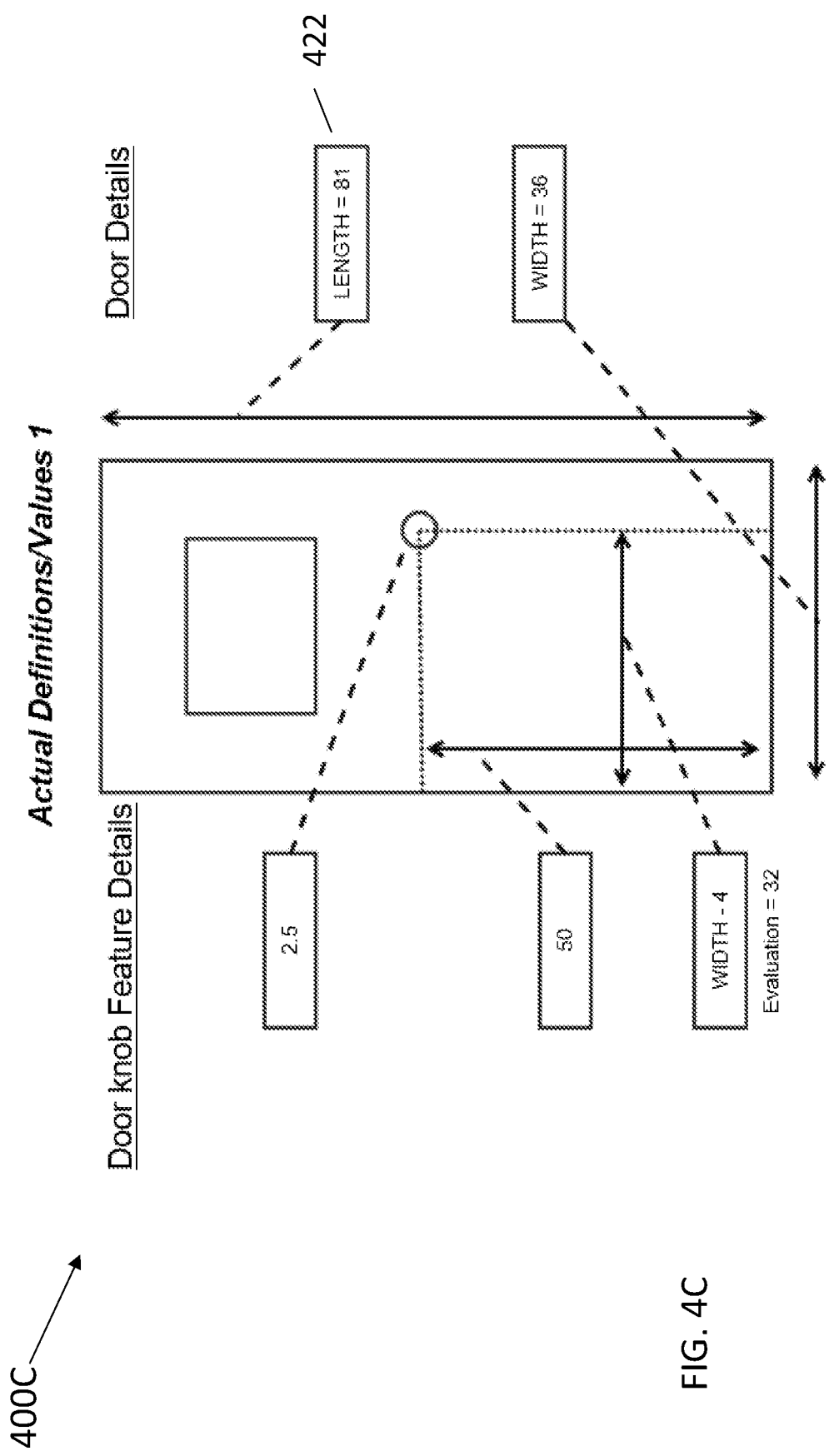
FIG. 4C shows a schematic diagram of the of FIG. 4A having actual measurements varying from the dimensions of 4A.
Figure 4D:
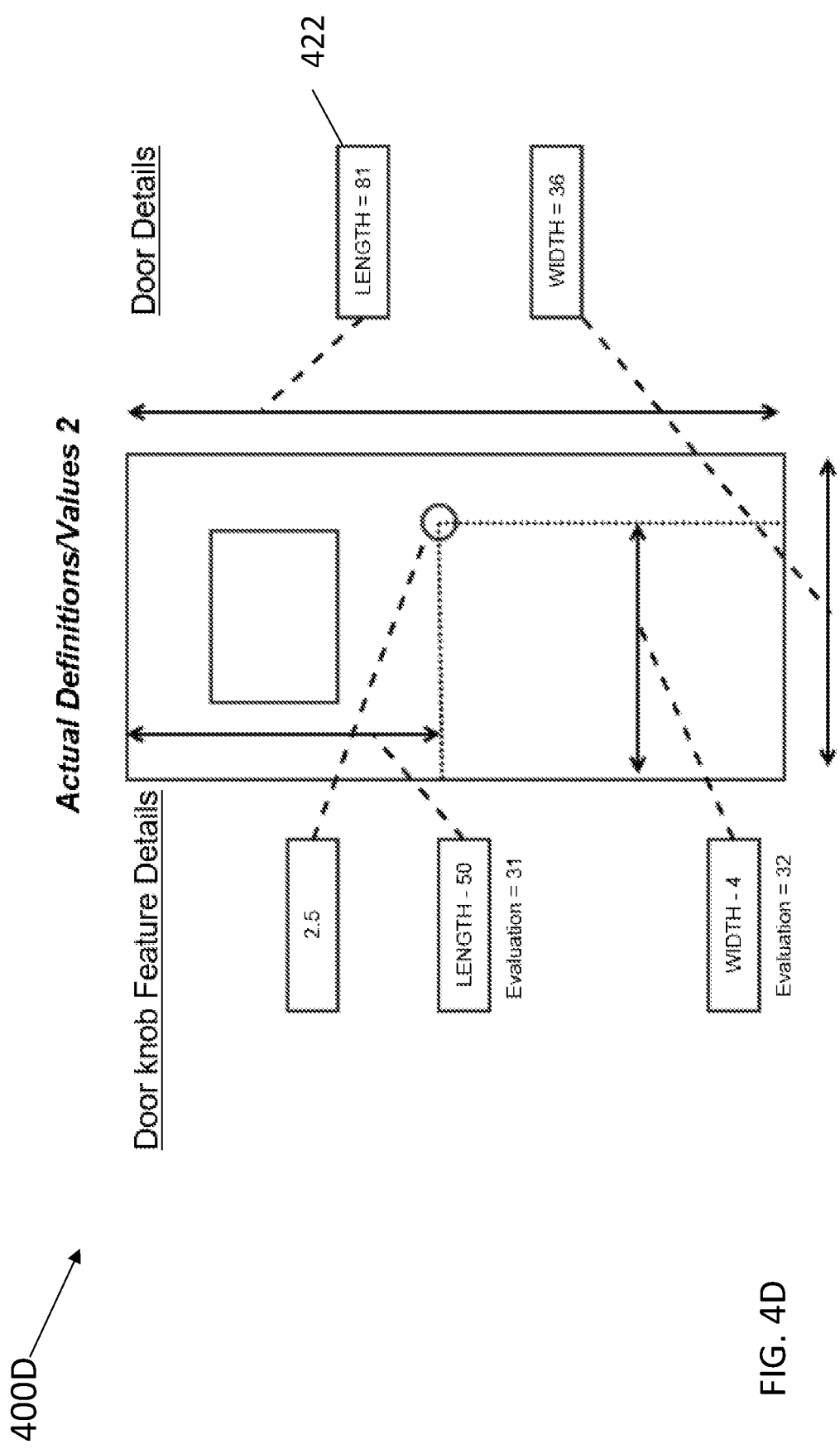
FIG. 4D shows a schematic diagram of the of FIG. 4B having actual measurements varying from the dimensions of 4B.

FIGS. 4C and 4D show a schematic diagram of FIGS. 4A and 4B having actual measurements each. The measured length of the door is eighty-one inches.

Example 400C shows a door having a length 422 of eighty-one inches. Measuring from the bottom, the system puts the feature, in this case a doorknob, fifty inches up from the bottom of the door as specified.

In example 400D the evaluation of the same production door with the differently parameterized definition is still equivalent. In this case, measuring from the top the feature is set to thirty-one inches. The length from the bottom of the door to the doorknob is still fifty inches (81−31=50), which shows the consistent mapping of design intent using alternative datum definitions.

Figure 5B:
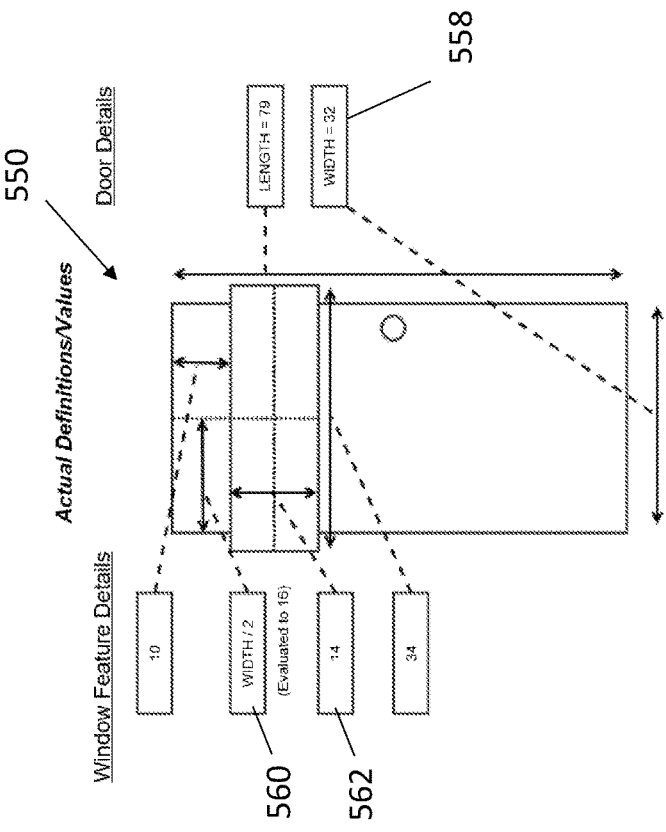
FIG. 5B depicts an example of Production-time Validation of the door of FIG. 5A having real dimensions.
Figure 5A:
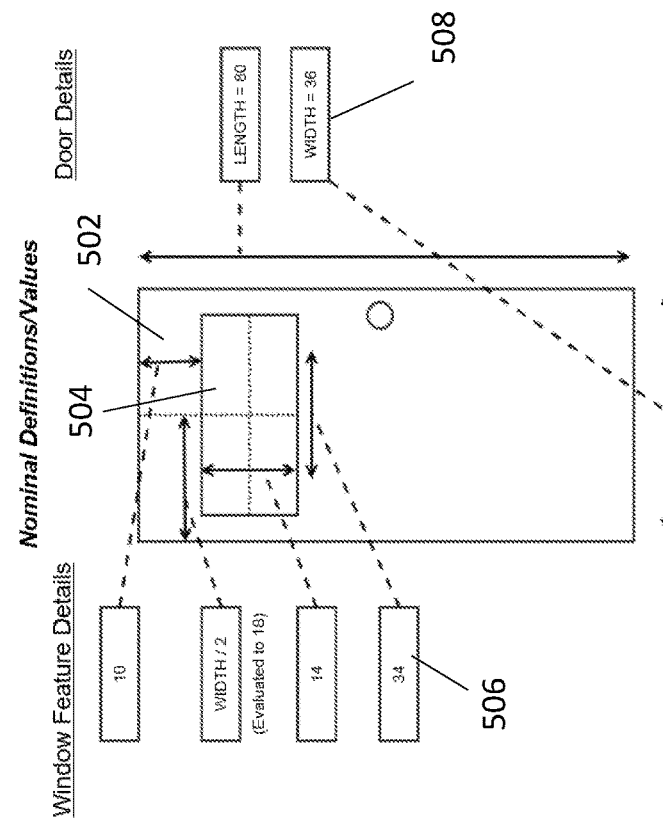
FIG. 5A depicts an example of Production-time Validation of a door having nominal dimensions.

FIGS. 5A and 5B depict an example of Production-time Validation of a door comparing nominal dimensions to real dimensions respectively. In this case, again, a door 502 is being fitted with a window 504 centered width-wise on the upper part of a door. The width of the window 506 is a literal value of thirty-four inches. The Width of the door (nominally) is thirty-six inches, which makes this door nominally validated.

However, in production 550, the measured width 558 is thirty-two inches. The intent to keep the window centered 560 is honored and updated to sixteen inches. But since the overall window width 562 is a literal thirty-four inches, the door would be cut in half if this job was carried out, causing the job to become invalid.

The software then prompts the operator if they wanted to continue to cut the door in half or reject the job, but in either case, the software would report which features are causing the problem or ambiguity, so that an operator can handle the issue.

Figure 6A:
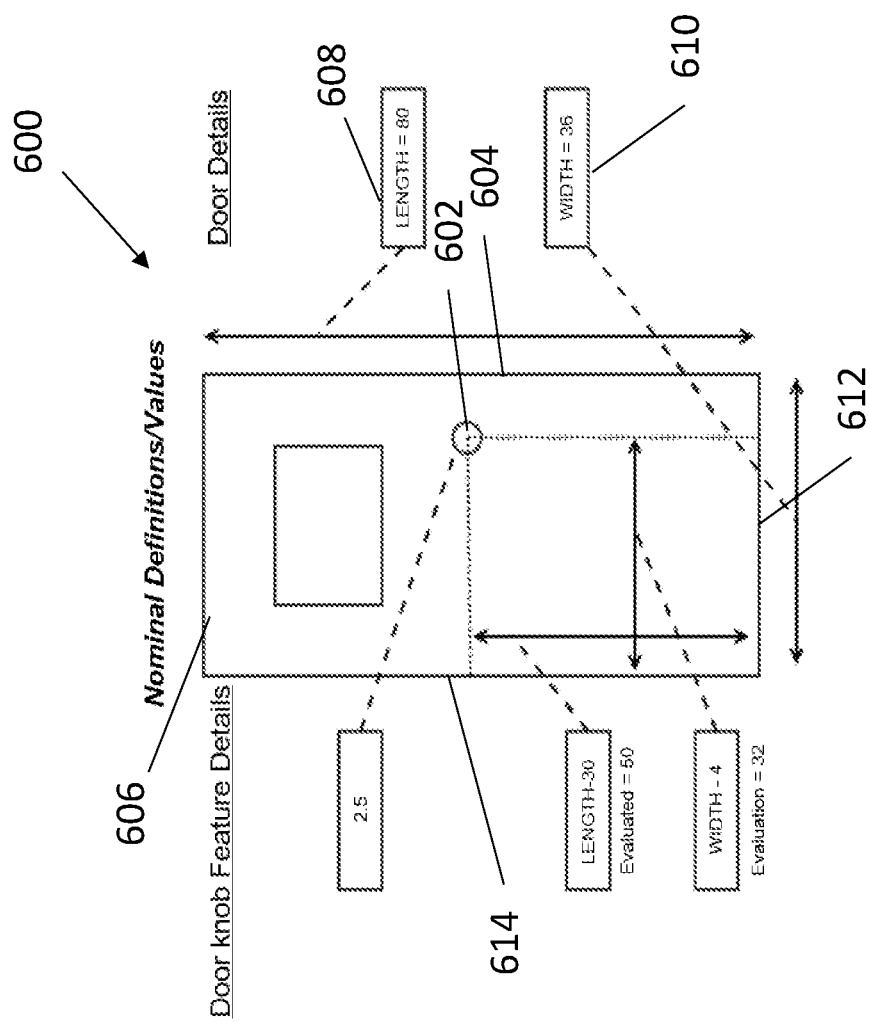
FIG. 6A shows an example of Design intent mapping of a door having nominal dimensions.

FIGS. 6A, 6B, and 6C depict examples of design intent mapping from Nominal door 600 to Production door 630 and 660. In this situation relationships between the doorknob 602 and two non-moving edges, the lock edge 604 and top edge 606, need to be maintained. In this example, the intended position of the doorknob 602 is set at four inches from the lock edge 604 and thirty inches from the top edge 606.

Door 600 has nominal definition values as set forth. The length 608 is eighty inches, the width 610 is thirty-six inches, the doorknob 602 feature size is two and a half inches in diameter. In Door 600 having nominal dimensions, the doorknob feature position results in a location that is fifty inches from the bottom edge 612 and thirty-two inches from the opposite edge of the door 614, keeping within the parameters of the intended design. As dimension are varied on the actual door, the design intent is maintained. For the first actual door 640, the door length is longer than usual at ninety inches and the width is thinner than usual at thirty inches, but since the doorknob position is defined using intent, the relationship from the top edge and the lock edge is maintained. Therefore, having actual dimensions that are different from the nominal dimensions of Door 600, in Door 640 the doorknob feature position results in a location that is sixty inches from bottom, and twenty-six inches from the opposite edge, keeping within the parameters of the intended design.

Again, in Door 670, the dimensions of the actual door vary in production and it happens that those dimensions result in a short, wide door. Since the feature geometry is defined with design intent encoded in and the measurement system updates the symbol values, design intent is still preserved. Door 670 has a length shorter than usual at forty inches and the width is more than usual at forty-five inches. Therefore, having actual dimensions that are different from the nominal dimensions of Door 600, in Door 670 the doorknob feature position results in a location that is ten inches from bottom, and forty-one inches from the opposite edge, keeping within the parameters of the intended design.

Figures 7A, 7B:
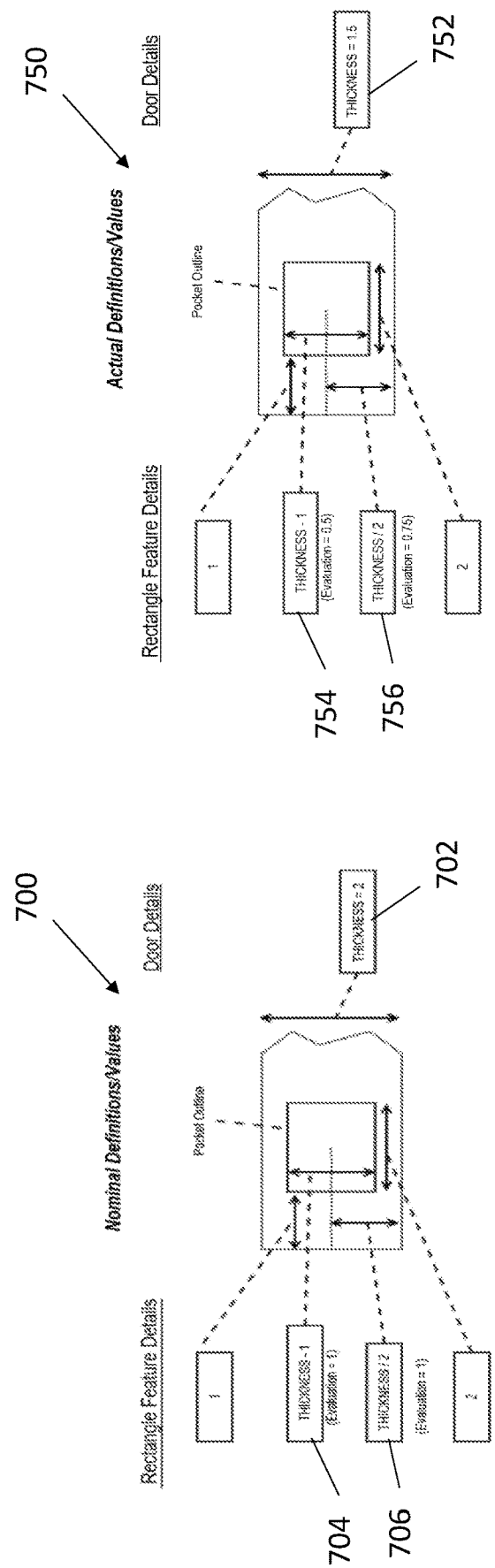
FIG. 7A shows an example of Dynamic Tool Selection and Validation of a door having nominal dimensions.
FIG. 7B shows an example of Dynamic Tool Selection and Validation of the door of FIG. 7A having real dimensions.

FIGS. 7A and 7B depict an example of Dynamic Tool Selection and Validation where the user intends to route a pocket on the edge of a door. FIGS. 7A and 7B show the broken view of the door, with the thickness being the vertical axes and the length being the horizontal axis.

Nominal door 700 has a total thickness 702 of two inches, an intended pocket thickness 704 of total thickness 702 minus one inch resulting in this nominal case in a one-inch pocket, and a center line 706 set at total thickness 702 divided by two resulting in this nominal case in a center line 706 set at one inch. For this nominal case, the system validates the door job and selects a router tool which has a diameter of 0.875, which is small enough to route the pocket, which has the nominally evaluated dimensions of two inches wide and one inch tall.

In production Actual Door 750 is queued and measured for the aforementioned job. The actual measurement of Actual Door 750 is a thickness of one and a half inches.

With this new information, the expressions need to be re-evaluated and dimensions (2) and (3) are now 0.5 and 0.75, respectively. Actual door 750 has a total thickness 752 of one and a half inches, the intended pocket thickness 754 of total thickness 752 minus one inch resulting in this case in a half inch pocket, and a center line 756 set at total thickness 752 divided by two resulting in this case in a center line 756 set at three quarters of an inch.

This change invalidates the original tool selection since a 0.875-inch router will not fit inside of a pocket which is 2×0.5 inches. The system now has the information to be able to make a dynamic decision to either select a smaller tool if one is available (e.g. a 0.5-inch router) or invalidate the job if there is no such tool available on the machine line.

Figure 8B:
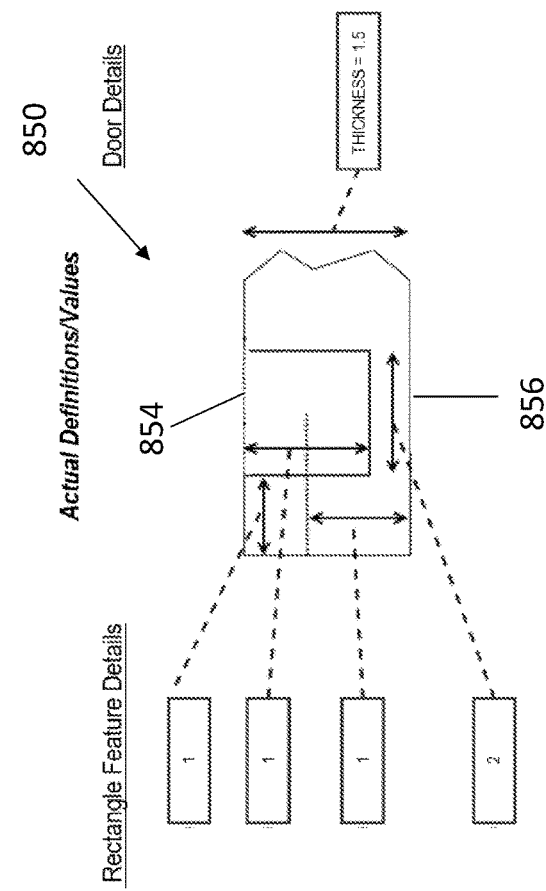
FIG. 8B shows an example of Design Intent Mapping Topological change of the door of FIG. 8A having nominal dimensions.
Figure 8A:
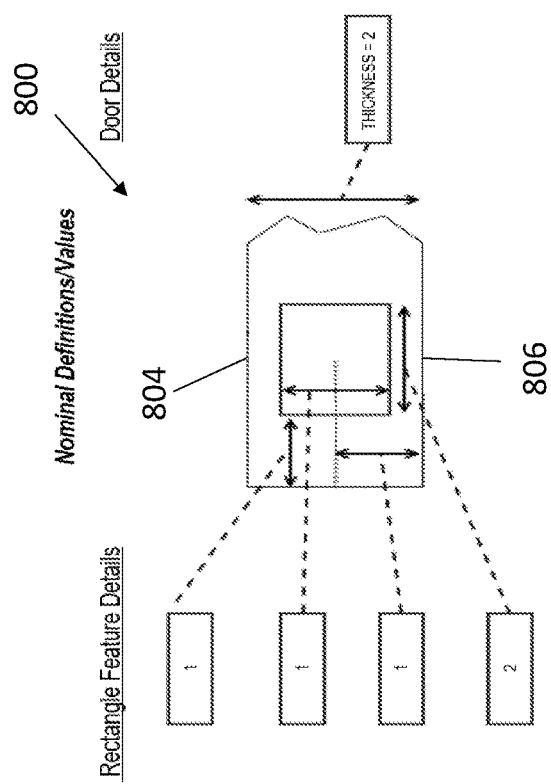
FIG. 8A shows an example of Design Intent Mapping Topological change of a door having nominal dimensions.

FIGS. 8A and 8B depict an example of design intent mapping topological change to production door where there is a pocket to be routed on an edge of the door.

All dimensions are literals and the intent that the designer has, is very clear. Neither the top face skin 804 nor the lower face 806 is broken, for this nominal case. The designer, however, has indicated that the lower face 806 should never be broken (implicitly).

In production, actual door 850 is queued and measured. The actual thickness of the actual door 850 turns out to be one and a half inches.

This new information about the door parameters shifts the pocket up and actually breaks the skin on the top face 854. This is a topological modification compared to the nominal case, but that is what the designer implicitly communicated his intent to be, given the parameterization. Furthermore, in certain embodiments, a designer can indicate that he/she does not want the topology to vary, which would then fail general validation for the actual dimensional parameters.

Figure 9B:
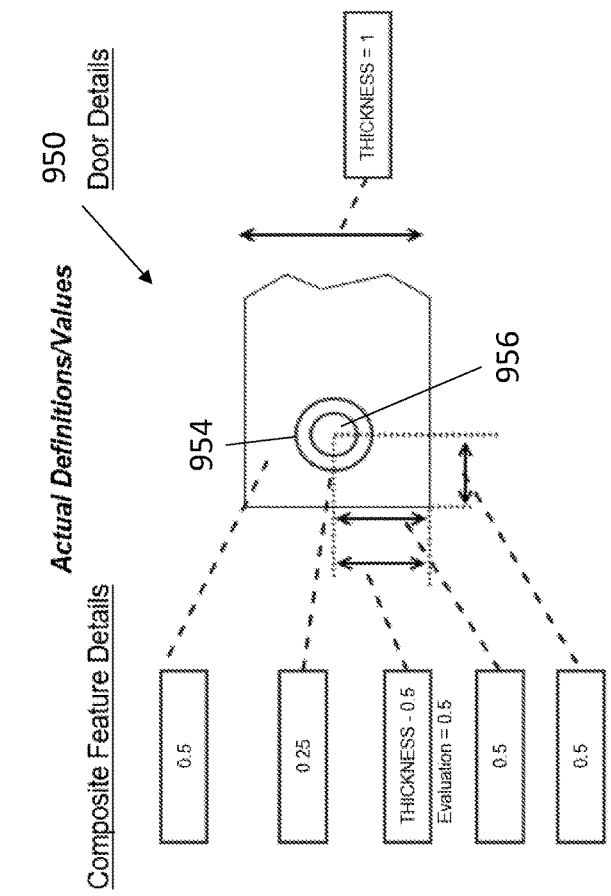
FIG. 9B shows an example of the door of FIG. 9A with real dimensions having Composite Features, avoiding, 'air-cuts' and optimizing speed.
Figure 9A:
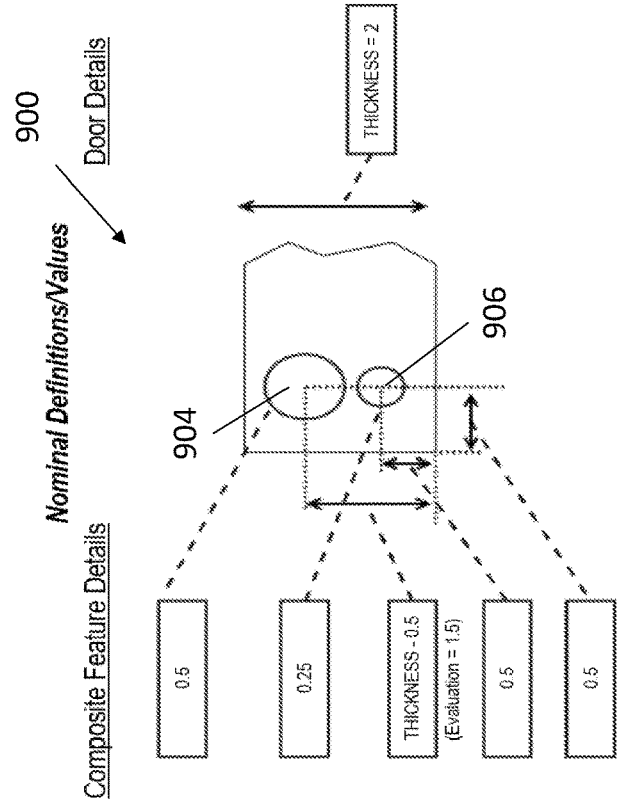
FIG. 9A shows an example of a door with nominal dimensions having multiple features.

FIGS. 9A and 9B depict an example of Composite Features, avoiding "air-cuts" and optimizing speed where there are two features to be cut into the edge of a door. There is a larger-diameter circle 904 whose depth is shallower and a smaller-diameter circle 906 whose depth is deeper. They are parameterized such that there may or may not be overlap between the features.

In the nominal case 900, the features do not share any of the same volumetric space. When the door actually goes into production, it turns out that one particular door blank only has a thickness of one inch, as shown FIG. 9B. Holes 954 and 956 now share of the same volumetric space. The larger hole 954 is still shallower and the smaller hole 956 is still deeper, so there is some mutually exclusive volumes to cut as well as overlapping cut areas.

Given this situation, the toolpaths generated could avoid the air-space that would be present due to the two volumes intersecting and only cut the overlapping airspace once, for the outer hole. The inner hole-depth that is mutually exclusive to that feature would still be cut. This optimization saves the manufacturing company valuable time.

Alternatively, if the two holes had been the same depth, the toolpath generation could have completely ignored the toolpath from the inner hole, saving manufacturing time through pathing and potentially through the lack of a tool change.

In an alternate embodiment, Door dimensional tolerance can be used for quality assurance. A designer can define particular tolerances for a given door job. For instance, nominal door dimensions can be set to Length=80, Width=40, Thickness=2. Next. The designer can for instance, set inclusive tolerance ranges of acceptance to be intervals such as [Nominal Length−0.5, Nominal Length+0.25], [Nominal Width−0.125, Nominal Width+0.375], [Nominal Thickness−0.1, Nominal thickness+0.1].

Given this information, when that door job goes into production and a door blank in the queue has dimensions that exceed or don't meet the dimensional requirements+/− the tolerances, then the door blank can be rejected automatically. For example, if a door blank comes along with a length of eighty-one inches, regardless of width or thickness, it can be rejected as out of tolerance automatically. Similarly, if any of the specifications are outside of their acceptance intervals, they can be rejected automatically.

Automatically rejecting faulty stock materials has many benefits. Some benefits of this include less time, energy, materials, and/or machine-life is wasted on cutting a door that will ultimately be rejected by quality assurance.

Since the rejection occurs for specific reasons, the data can be stored and/or logged so that the door manufacturer can understand the root-causes of the rejection rates that are experienced, such as a particular vendor is supplying door stock that is consistently faulty in at least one dimension or measurement, such as too wide, although the stock material is fine otherwise.

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims and can include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

What is claimed is:

1. A computer-implemented method of manufacturing comprising the steps of:
    receiving nominal values of one or more dimensions of an article of manufacture, the nominal values comprising literal and symbolic values;
    measuring, via a sensor, the actual dimensions of the article of manufacture;
    dynamically calibrating the nominal values based on the actual dimensions to establish adjusted nominal values; and
    generating a tool path for the article of manufacture based upon the adjusted nominal values.

2. The computer-implemented method of claim 1, wherein the adjusted tool path maintains a design intent of the computer-implemented method of manufacturing.

3. The computer-implemented method of claim 1, wherein the adjusted nominal values retain the literal specification values of the nominal values while adjusting the symbolic specification values based on the actual dimensions.

4. The computer-implemented method of claim 1, wherein, the step of generating the tool path is based at least in part upon a numerical controlled subsystem, at least in part upon user entered article of manufacture dimensional data, and at least in part upon numerical controlled subsystem measured stock material dimensional data.

5. The method of claim 4, wherein the numerical controlled subsystem includes a cutting tool selected from the group consisting of chisels, wedges, drill bits, shavers, router bits, saw blades, high voltage electrical cutters, chemical combustion cutters, high pressure water cutters, laser cutters, and combinations thereof.

6. The method of claim 4, wherein the numerical controlled subsystem includes a joining tool selected from the group consisting of staplers, nailers, screw-drivers, adhesive systems, joinery mechanisms, chemical combustion welders, high voltage electrical welders, laser welders, friction welders, and combinations thereof.

7. The computer-implemented method of claim 1, further comprising generating, via a processor, automated tool selection data.

8. The method of claim 1, further comprising providing and maintaining a database of a plurality of article of manufacture feature-level shapes for utilization by a user.

9. The method of claim 1, further comprising software executing on the processor for providing and maintaining a database comprising analytic information related to numerical controlled subsystem production of articles of manufacturing.

10. The method of claim 1, wherein the article of manufacture produced is selected from the group consisting of custom doors, architectural doors, entry doors, pre-hung doors, door jambs, door trim, or combinations thereof.

11. A computer-aided manufacturing system comprising:
a processor configured to receive nominal values of one or more dimensions of an article of manufacture, the nominal values comprising literal and symbolic specification values; and
a sensor configured to measure the actual dimensions of the article of manufacture,
wherein the processor dynamically calibrates the received nominal values based on the actual dimensions to establish adjusted nominal values and generates a tool path for the article of manufacture based upon the adjusted nominal values.

12. The system of claim 11, wherein the adjusted tool path generated based on the adjusted nominal values maintains a design intent of the computer-aided manufacturing system.

13. The system of claim 11, wherein the adjusted nominal values retain the literal specification values of the nominal values while adjusting the symbolic specification values based on the actual dimensions.

14. The system of claim 11, further comprising a numerical controlled subsystem, the step of generating a tool path is based at least in part upon a numerical controlled subsystem, at least in part upon user entered article of manufacture dimensional data, and at least in part upon numerical controlled subsystem measured stock material dimensional data.

15. The system of claim 11, wherein the system generates, via a processor, automated tool selection data.

16. The system of claim 11, further comprising a database of a plurality of article of manufacture feature-level shapes for utilization by a user.

17. The system of claim 16, wherein the database comprises analytic information related to numerical controlled subsystem production of articles of manufacturing.

18. The system of claim 17, wherein the numerical controlled subsystem includes a cutting tool selected from the group consisting of chisels, wedges, drill bits, shavers, router bits, saw blades, high voltage electrical cutters, chemical combustion cutters, high pressure water cutters, laser cutters, and combinations thereof.

* * * * *